United States Patent
Polychronidis et al.

(10) Patent No.: US 11,663,306 B2
(45) Date of Patent: May 30, 2023

(54) SYSTEM AND METHOD FOR CONFIRMING A PERSON'S IDENTITY

(71) Applicant: iCrypto, Inc., Beaverton, OR (US)

(72) Inventors: Vasilis Polychronidis, Sammamish, WA (US); Adarbad Master, Oldsmar, FL (US); Michal Kepkowski, Kielce (PL)

(73) Assignee: iCrypto, Inc., Beaverton, OR (US)

( * ) Notice: Subject to any disclaimer, the term of this patent is extended or adjusted under 35 U.S.C. 154(b) by 361 days.

(21) Appl. No.: 16/495,988

(22) PCT Filed: Mar. 24, 2018

(86) PCT No.: PCT/US2018/024221
§ 371 (c)(1),
(2) Date: Sep. 20, 2019

(87) PCT Pub. No.: WO2018/176020
PCT Pub. Date: Sep. 27, 2018

(65) Prior Publication Data
US 2021/0294880 A1 Sep. 23, 2021

Related U.S. Application Data

(60) Provisional application No. 62/476,484, filed on Mar. 24, 2017.

(51) Int. Cl.
*G06F 21/32* (2013.01)
*G06F 16/9535* (2019.01)
(Continued)

(52) U.S. Cl.
CPC .......... *G06F 21/32* (2013.01); *G06F 16/9535* (2019.01); *G06F 21/33* (2013.01); *G06V 30/413* (2022.01); *G06F 2221/2139* (2013.01)

(58) Field of Classification Search
CPC ..................................................... G06F 21/33
See application file for complete search history.

(56) References Cited

U.S. PATENT DOCUMENTS

| 8,200,980 B1 | 6/2012 | Robinson et al. |
| 2001/0027527 A1 | 10/2001 | Khidekel et al. |

(Continued)

OTHER PUBLICATIONS

International Search Authority (ISA), "International Search Report," International Application No. PCT/US2018/024221, dated Jun. 18, 2018, 2 pages, publisher Commissioner for Patents—PCT, United States of America.

(Continued)

*Primary Examiner* — Simon P Kanaan
(74) *Attorney, Agent, or Firm* — Fogarty LLP

(57) ABSTRACT

Embodiments of the invention provide systems and methods for using programmatic means to verify the identity of a person. By scanning the person's documents and/or biometric data and comparing them to available government and private databases, the validity of those documents and identity of the person can be confirmed with a high confidence level. The process can assign a score to each item verified which is then computed into an overall confidence score which is available to other processes to rely on for approval of transactions. The identity is digitally combined with the credentials of the mobile phone to create a reusable identity token. Together with the confidence score, the identity token represents the verified biometric information of the person and is tied to the mobile phone.

20 Claims, 4 Drawing Sheets

(51) Int. Cl.
*G06F 21/33* (2013.01)
*G06V 30/413* (2022.01)

(56) References Cited

U.S. PATENT DOCUMENTS

| | | |
|---|---|---|
| 2013/0179692 A1 | 7/2013 | Tolba et al. |
| 2016/0162729 A1 | 6/2016 | Hagen et al. |
| 2016/0241402 A1 | 8/2016 | Gordon |
| 2016/0306955 A1 | 10/2016 | Martin et al. |
| 2020/0294410 A1* | 9/2020 | DelBane .................. G06K 9/46 |

OTHER PUBLICATIONS

International Search Authority (ISA), "Written Opinion," International Application No. PCT/US2018/024221, dated Jun. 18, 2018, 8 pages, publisher Commissioner for Patents—PCT, United States of America.

International Bureau, "Notification Concerning Transmittal of International Preliminary Report on Patentability (Chapter 1 of The Patent Cooperation Treaty) (PCT Rule 44bis.1(c))," International Application No. PCT/US2018/024221, dated Oct. 3, 2019, 1 page, publisher The International Bureau of WIPO, Geneva, Switzerland.

International Bureau, "International Preliminary Report on Patentability (Chapter I of The Patent Cooperation Treaty) (PCT Rule 44bis))," International Application No. PCT/US2018/024221, dated Sep. 24, 2019, 9 pages, publisher The International Bureau of WIPO, Geneva, Switzerland.

* cited by examiner

SYSTEM AND METHOD FOR CONFIRMING A PERSON'S IDENTITY

CROSS-REFERENCE TO RELATED APPLICATIONS

This application claims the benefit of the filing date of U.S. Provisional Patent Application No. 62/476,484, which was filed Mar. 24, 2017, the disclosure of which is hereby incorporated by reference herein in its entirety.

BACKGROUND

In current systems, a person's identity is established by requiring the person to physically present themselves and their documents at a venue where trusted personnel can review the material and establish that the person matches the documentation (i.e., verify that the person is who the person claims to be). This process, however, is open to abuse. The person reviewing the documents could be corrupted and may be in partnership with the presenter of the documents thereby improperly accepting and verifying a false identity. Another problem is that the presented documents are typically reviewed only visually by the examiner to evaluate authenticity. This allows situations where high-quality but fraudulent documents are accepted to verify an identity.

It can be difficult, impractical, and/or time consuming to crosscheck the presented documents. Moreover, crosschecking documents through other channels may not improve the accuracy of document verification. For example, if the documents declare that the presenter is John Doe and then a credit check is made on John Doe and found to be in order, there is still no guarantee that the presenter actually is John Doe. A picture on a document may be that of the presenter, but not a picture of the actual John Doe if the documents have been forged. Identity theft can occur when all documents are confirmed, but there was no confirmation with the person's biometric information, such as a picture, video, fingerprint, or iris scan captured at the time of identity checking.

It may also be difficult or impractical and time consuming to require a person to physically be present to have their identity verified. The verification location may be a long distance away and prove to be a great hardship or cost to the person. There may be a need to reconfirm the identity of a person during a real time transaction and the existing systems would be not be able to facilitate this. This results in additional risk to the system or transaction if the reconfirmation is not practical.

SUMMARY OF THE INVENTION

Embodiments of the invention provide systems and methods for using programmatic means to verify the identity of a person. By scanning the person's documents and/or biometric data and comparing them to available government and private databases, the validity of those documents and identity of the person can be confirmed with a high confidence level. The process can assign a score to each item verified which is then computed into an overall confidence score which is available to other processes to rely on for approval of transactions. The identity is digitally combined with the credentials of the mobile phone to create a reusable identity token. Together with the confidence score, the identity token represents the verified identity combined with biometric information of the person and is cryptographically combined with specific attributes of the mobile phone.

In an example embodiment, a system and method are disclosed for verifying a user's identification artifacts and/or documents, including biometric parameters, against trusted databases and to combine them with validated mobile device parameters thereby creating a cryptographically secure digital identifier.

In another example embodiment, a system and method are disclosed for applying a value to each identification artifacts and/or documents, including biometric parameters, and to the mobile device parameters in order to quantify a level of assurance that the person has been successfully identified.

BRIEF DESCRIPTION OF THE DRAWINGS

Figure 1:
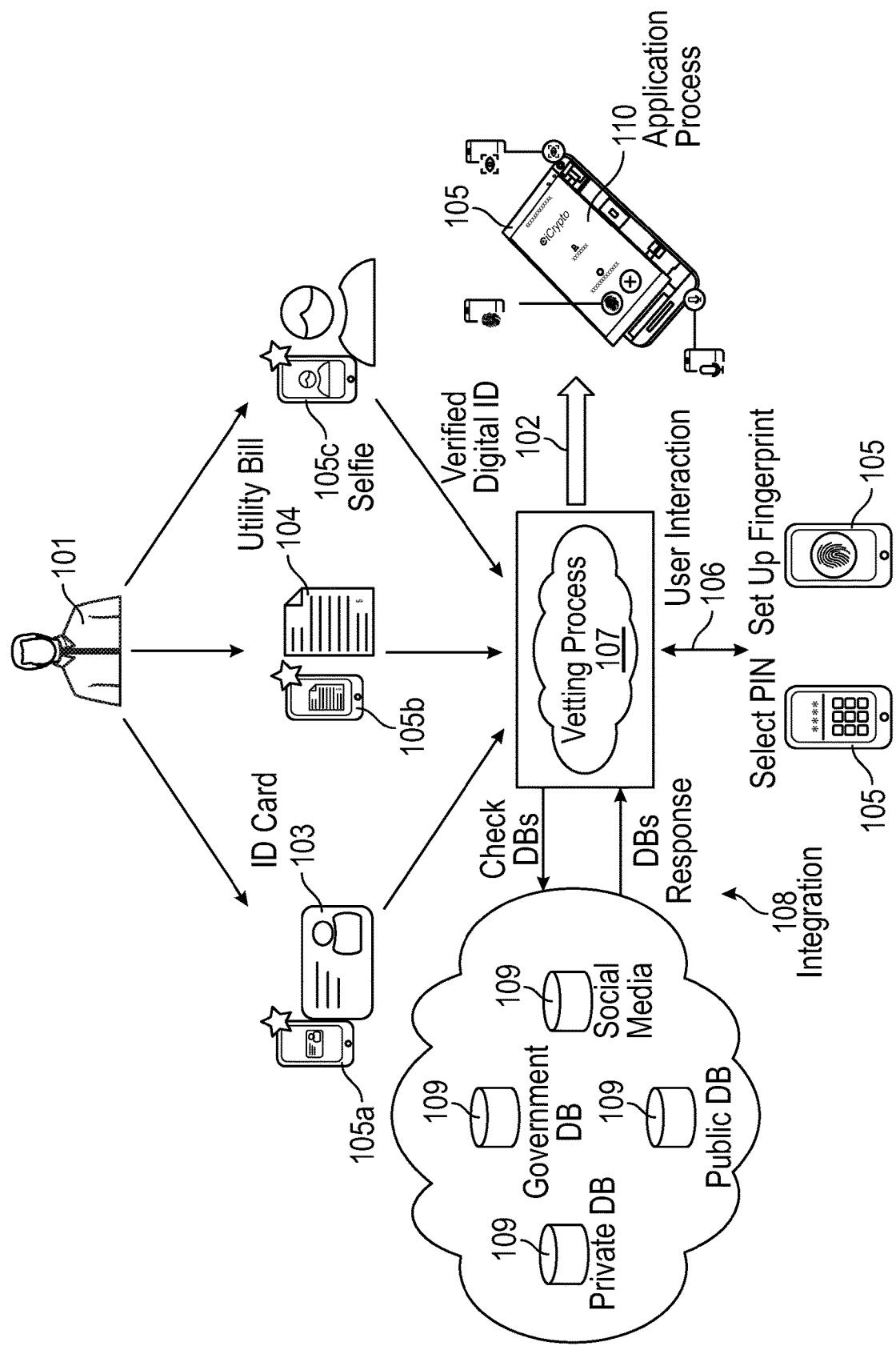

Having thus described the invention in general terms, reference will now be made to the accompanying drawings, wherein:

FIG. 1 is a block diagram illustrating one embodiment of a system for confirming a person's identity.

Figure 2:
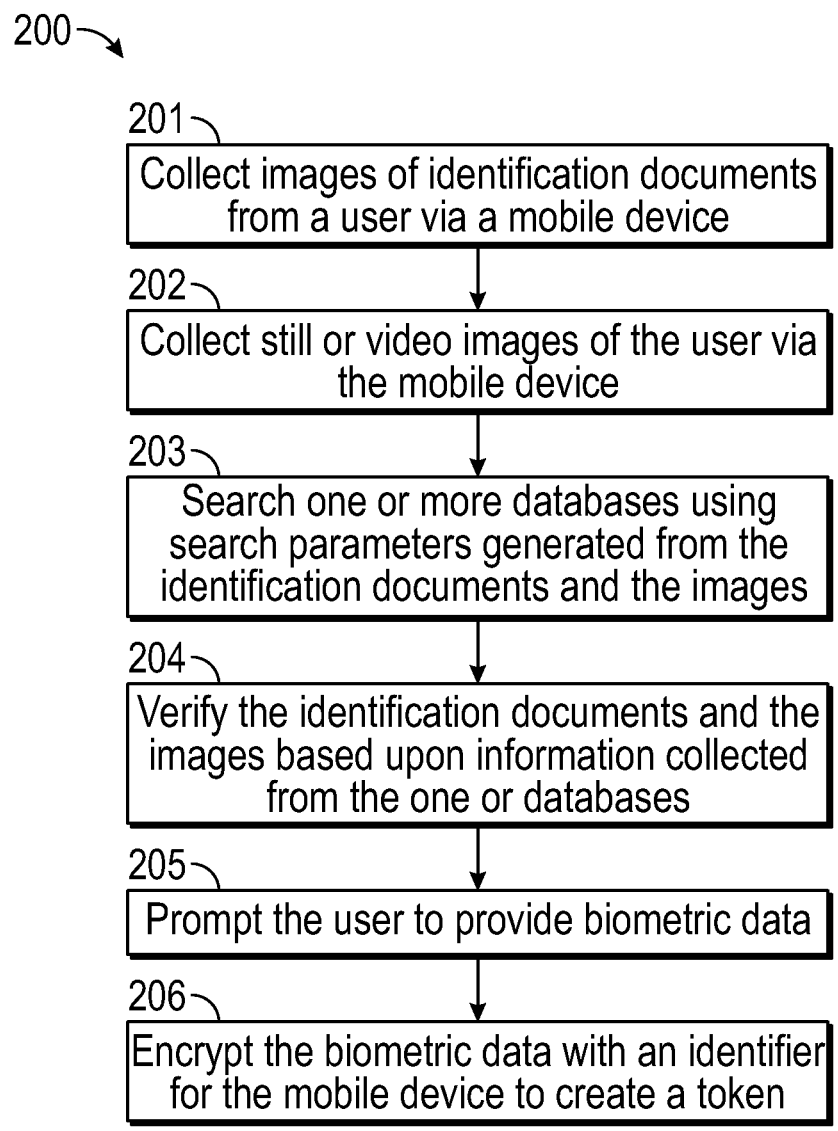
Figure 3:
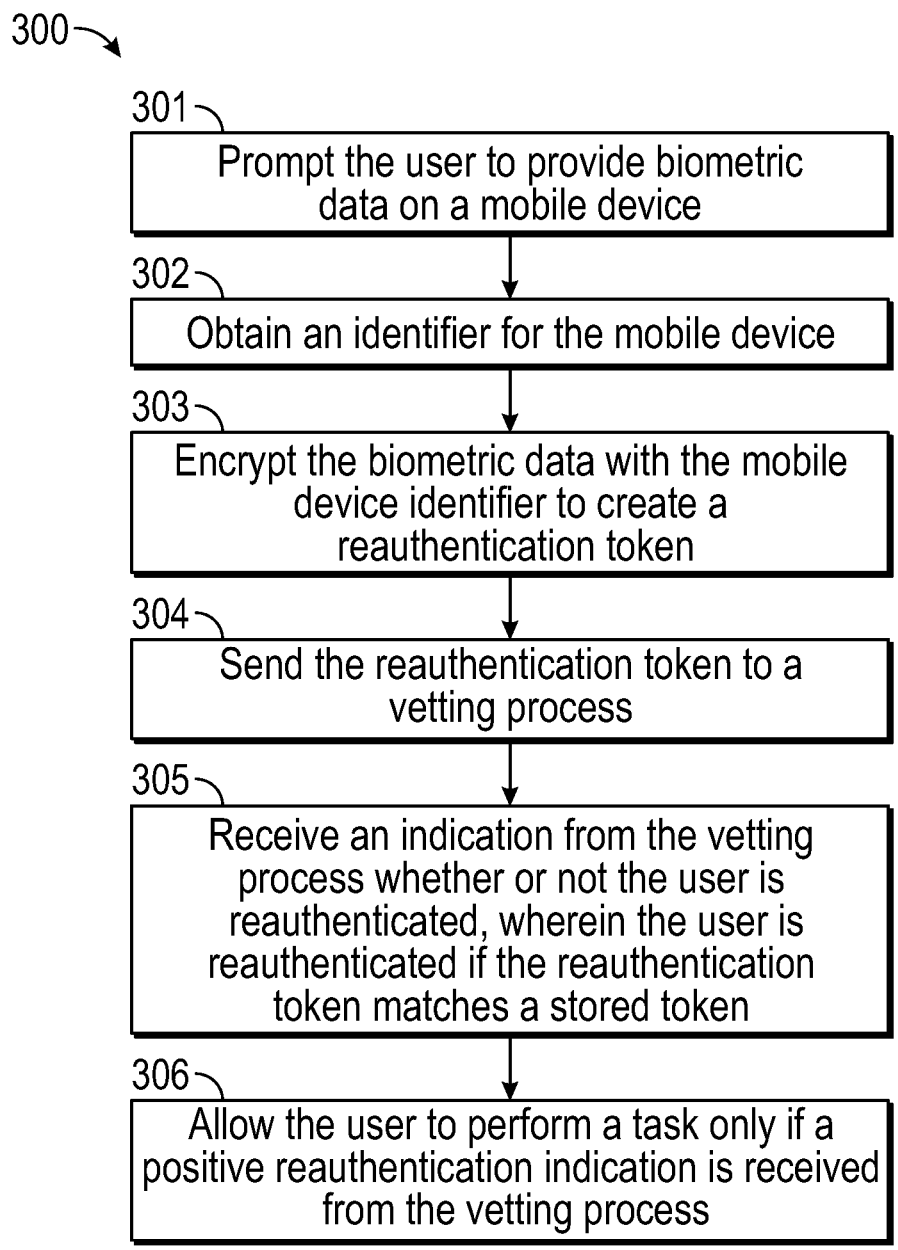

FIG. 2 is a flowchart illustrating an example process for creating a token that can be used to confirm a person's identity FIG. 3 is a flowchart illustrating an example process for reauthenticating a user.

Figure 4:
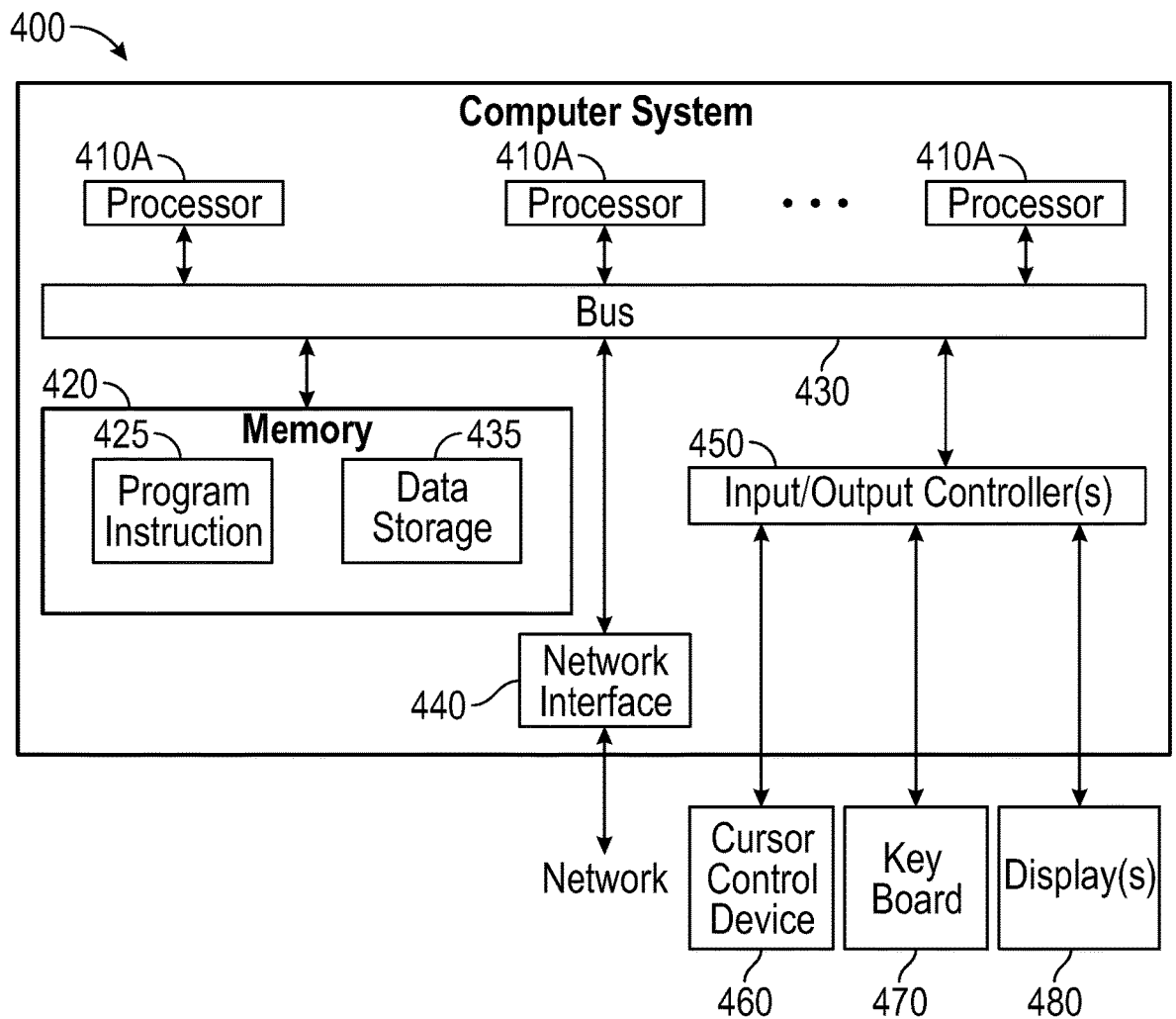

FIG. 4 is an example schematic of a computer system in accordance with some embodiments.

DETAILED DESCRIPTION

The invention will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The following terms are used in the examples set forth in the description below and have the following meaning in the example embodiments:

Mobile device—typically refers to a mobile telephone or smartphone but may also be a vehicle, tablet computer, laptop computer, television, or any device that is connected to a network by a fixed or wireless data channel.

Biometric sensor—refers to a scanner, sensor, or detector on the mobile device that is used to read any biometric features, including, but not limited to, an iris scanner, facial recognition, ultrasonic fingerprint scanner, heart monitoring, and voice recognition. In some examples, the biometric sensor may be a fingerprint scanner that is used to read the fingerprint of a user.

Login—refers to the process of authenticating a user to an application. For the purposes of this invention, this may also include, but is not limited to, reauthentication during a session with an application to reaffirm the user identity, confirmation of the user identity for the purposes of non-repudiation of a transaction or access, and confirmation of the user identity for purposes of authentication when calling another party (e.g., calling into a customer service desk).

The subject invention uses the capabilities of a mobile device and a mobile network to provide current biometric information that can be compared to information available in numerous third-party, government, or commercial databases to validate that the person is who the person says they are. The validity of the presented documents is then cryptographically combined with parameters from the mobile device so that both are securely linked. In the future, if the person's identity needs to be reconfirmed then the mobile device is used to recapture the person's biometrics, which can be compared to the stored data for the person's identity.

The example embodiments disclosed herein automate what has been a physical vetting process and improve the accuracy of the identity verification. Moreover, in the disclosed embodiments, the person seeking verification and the associated documents do not have to be physically present with the authenticator. Instead of physically showing documents to an authenticating person, the documents are photographed using the camera on a mobile device. The picture of the document is time-stamped and the location where the picture of the document was taken is recorded. The picture is processed to extract any relevant information (e.g., name and identification number, such as a driver's license number) and/or biometrics (e.g., a picture of the person). The person seeking authentication can also be asked to photograph a recent utility bill to verify an address and billing name. The fingerprint of the person seeking authentication can be also recorded if the mobile device has that capability or a "selfie" (i.e., a photograph or video of oneself) may be taken using the mobile device. All of these data points are then checked against third-party, government, or commercial databases. For example, a state Department of Motor Vehicles database may be used to confirm the driver's license data (e.g., driver's license number, name, address, picture, etc.), an FBI database may be used to confirm that a fingerprint matches a name, and a commercial or private database (e.g., Equifax) may be used to verify financial information. The selfie photograph of the person seeking authentication can be checked against the picture on the driver's license or other government issued ID as well as checked against social media pictures. Having many data points that are checked and correlated will result in a higher confidence score confirming the identity of the person.

Once these data points are checked and crosschecked, the user is assigned a digital identity. This is a cryptographically secure identifier that can be used in place of all the documents and biometric information that were presented in the vetting process. The digital identity is a cryptographic combination of the identity information captured and the parameters of the mobile device. The mobile device parameters may include, for example:

IMSI (International Mobile Station Identity),
IMEI (International Mobile Equipment Identity), and/or
MSISDN (Mobile Station International Subscriber Directory Number).

Applications can use this digital identity along with its related confidence score to authorize transactions. The applications can also trigger a trust elevation that might require the user to submit a new selfie. That new selfie is then compared to the one associated with the digital identity to reconfirm the user's identity and/or that the user's identity has not been compromised.

Network and mobile device data may also be factored into the vetting process. For example, the location tag for the selfie photograph can be checked against the location of the mobile device as reported by the network. This prevents the selfie image data from declaring one location (e.g., via compromised device software) when the picture was actually taken somewhere else (e.g., the network says mobile device is in Russia, but the selfie image data says the photograph was taken in Washington, D.C.).

FIG. 1 is a block diagram illustrating one embodiment of a system for confirming a person's identity. A user 101 wishes to obtain a digital identity (Digital ID) or token 102.

The user 101 has a number of documents available, such as, for example, one or more government ID 103 (e.g., a driver's license, passport, military ID, etc.) and/or invoices 104 (utility bill, phone bill, etc.). User 101 also has a mobile device 105 with a camera that can capture still or video images, which allows the user to take selfie pictures.

User 101 will request the Digital ID 102 via interaction 106 between mobile device 105 and vetting process 107. The vetting process 107 represents an application or process executing on an individual server or in a distributed datacenter. The user may access the vetting process 107 via a client application 110 and/or via a browser on mobile device 105. Client application 110 can use the features of mobile device 105 to take pictures, record audio (e.g., voiceprint) and video, capture fingerprint data, and receive PIN and password entries. Vetting process 107 prompts user 101 to take a picture of their driver's license 105a, their utility bill 105b, and themselves 105c. The picture of the user 105c may be a selfie, or may be taken by another person using mobile device 105, or may be short video of user 101. Vetting process 107 will process this information and will detect what type of documents (e.g., driver's license, utility bill, selfie, etc.) were presented. The term "document" as used herein will be understood to have a broad meaning to include still images, videos, printed and electronic text, forms, papers, identification cards, passports, photographs, invoices, statements, and the like. Vetting process 107 may use facial recognition to detect and extract user 101's picture from the documents. Vetting Process 107 may also use character recognition to extract text, numbers, and symbols from the documents. Some issued documents have imbedded chips that can be read using Near Field communication (NFC) capabilities of the mobile phone to capture data associated with the document.

As part of an integration process 108, the recognized characters and images and the captured data can then be used to search public and private databases 109, such as to compare the captured information to what is available from these databases 019. For example, the recognized characters and images and the captured data may be used to create search terms for the databases 109. The databases will return search results, such as official driver's license data, commercial invoice data, social media content, and the like, as part of integration process 108.

A driver's license can be checked against the one or more state Department of Motor Vehicles (DMV) databases to check if the information on the license matches the information in the DMV database. A picture captured from a driver's license can be compared to a DMV database to confirm that it is the same as what is on file at the DMV. Pictures may also be compared programmatically to confirm a match to images stored in the databases. Automated image comparisons may be more precise than what a human review can achieve because automated analysis uses the latest in computer-based facial recognition techniques that go beyond what a human eye can process. The picture captured from documents (e.g., from a driver's license) is also compared to the selfie and/or short video of the user. All of the picture captured from documents, the selfie, and/or the short video may also be compared to pictures available from social media. When a mismatch is detected between the captured data and the database information, the mismatch indicates that the driver's license or other document has been forged or is otherwise compromised.

Once the information captured from the documents is determined to match information in independent databases or is otherwise verified, user 101 is prompted via interaction 106 with vetting process 107 to secure this information by entering a PIN or using biometric data, such as using a fingerprint scanner. Vetting process 107 uses an algorithmic process to assign a confidence score to the database comparisons. Higher confidence scores represent a higher confidence that the provided document data confirms the identity of user 101.

Digital ID 102 is created by cryptographically combining some or all of the captured data (105a-c) with mobile device parameters (e.g., IMSI, IMEI, MSISDN) thereby specifically locking the captured data together with the mobile device 105. In the future, both the mobile device 105 and one or more of the captured documents (103, 104, picture of 101) need to be present to reauthenticate the user.

The vetting process 107 can assign a Digital ID 102 for user 101 to a mobile application 110. The Digital ID 102 may include a reference to the confidence score. Subsequent transactions can be authorized or denied for user 101 based on the Digital ID 102 and its confidence score. Some transactions (e.g., access to news articles) may be acceptable with a low confidence score as any potential loss is low. High confidence levels may be required for a financial transaction to ensure non-reputation or for access to confidential information to ensure security and/or privacy. The mobile application 110 may also prompt user 101 to reauthenticate at any time.

Application 110 may use the Digital ID 102 for various purposes. For example, Digital ID 102 can be generated using vetting process 107 in order to disclose specific information about the user, such as a current location or a payment history.

A device ID, which may be a token, is created and can be used to authenticate transactions associated with a mobile device. Embodiments allow, for example, on-boarding, verifying, or authenticating a user, employee, subscriber, or other person without requiring physical presence.

Biometric and/or other user information is combined and encrypted with data from the mobile device and/or from the mobile network to create the token. All of the data needed to create the token is available from or through the mobile device, such as biometric, location, time, and mobile identifier data. A mobile device such as a mobile telephone or smartphone is highly authenticated by the mobile network and, therefore, can be used to provide a highly unique identifier comprising a combination of the mobile device identifier and user biometrics. The token can later be used to verify the user and/or to confirm a user's location.

FIG. 2 is a flowchart 200 illustrating an example process for creating a token that can then be used to confirm a person's identity. In step 201, images of identification documents are collected from a user via a mobile device. The identification documents may be one or more of still images, videos, printed text, electronic text, forms, papers, identification cards, passports, photographs, invoices, statements, and biometric data.

In step 202, still or video images of the user are collected via the mobile device. The images of the user may be collected using a camera on the mobile device. The images of the user may include location data, such as GPS coordinates, identifying where the image was captured and/or time data identifying a date and time when the image was captured. The location data for the image may be compared to mobile device location information to determine if the image was captured at a current location of the mobile device. The time data may be compared to a current time to determine if the image was recently captured.

In step 203, one or more databases are searched using search parameters generated from the identification documents and the images. The databases may be one or more of a government database, a commercial database, and a social media database. The search parameters may be generated using character recognition processing on the identification documents. The search parameters may also be generated using facial recognition processing of images of the user. The search parameters may include one or more of a name, a date of birth, a driver's license number, a registration number, an address, an account number, and biometric parameters.

In step 204, the identification documents and the images are verified based upon information collected from the one or more databases. The information collected from the one or more databases may include financial record data, utility record data, social media data, and government record data.

In step 205, the user is prompted to provide biometric data. The biometric data may include one or more of an iris pattern, facial features, fingerprint, heartbeat, and voice signals.

In step 206, the biometric data is encrypted along with an identifier for the mobile device to create a token. The identifier for the mobile device may include one or more of an International Mobile Station Identity (IMSI), an International Mobile Equipment Identity (IMEI), a Mobile Station International Subscriber Directory Number (MSISDN), a unique mobile device identifier, and a network identifier. The token is created only if the identification documents and, therefore, the user's identity are verified. The token created in step 206 can be stored and used by vetting process 107, for example, to reauthenticate or verify the user identity in future transactions.

In one embodiment, a value may be applied to each identification document that was verified in step 204. The value corresponds to a level of confidence that the identification document has confirmed the identity of the user. The values may be combined to create a confidence score. The values may be summed, averaged, or otherwise algebraically or algorithmically combined to create the confidence score. For example, all of the identification documents may be weighted the same, or certain types of identification documents may be more heavily weighted than others. Alternatively, different weightings are applied to identification documents based upon the database used to verify the document. For example, information collected from a government database may be more trusted than information collected from a commercial or social media database. Finally, the confidence score may be associated with the token created in step 206. This confidence score may be considered in later transactions when reauthenticating the user. Confidence scores above a designated limit may be required for certain types of transactions, such as financial transactions, while a lower limit may be required for less critical transactions, such as accessing media content.

In one embodiment, the method of FIG. 2 is performed by an application, such as vetting process 107 (FIG. 1), running on a vetting server. The vetting server comprises at least one processor and a memory coupled to the at least one processor. The memory stores program instructions that are executable by the at least one processor to cause the computer system to perform the steps for creating a token.

FIG. 3 is a flowchart 300 illustrating an example process for reauthenticating a user. In step 301, the user is prompted to provide biometric data on a mobile device. The biometric data may comprise, for example, an iris pattern, facial features, fingerprint, heartbeat, or voice signals. In step 302, an identifier is obtained for the mobile device.

In step 303, the biometric data is encrypted along with the mobile device identifier to create a reauthentication token. The identifier for the mobile device may be, for example, an International Mobile Station Identity (IMSI), an International Mobile Equipment Identity (IMEI), a Mobile Station International Subscriber Directory Number (MSISDN), a unique mobile device identifier, or a network identifier.

In step 304, the reauthentication token is sent to a vetting process. In step 305, receive an indication from the vetting process whether or not the user is reauthenticated, wherein the user is reauthenticated if the reauthentication token matches a stored token.

In step 306, the user is allowed to perform a task only if a positive reauthentication indication is received from the vetting process. The task may be a financial transaction, a website login, an acknowledgement, access to a location or event, access to content, or any other action that requires enhanced security or privacy considerations. In another embodiment, the user is allowed to perform a task only if a reauthentication indication is received from the vetting process with a confidence score exceeding a prescribed threshold.

Current user data may also be sent to the vetting process with the reauthentication token. The current user data may be a current mobile device location, a time that the biometric data was captured by the mobile device, a location where the biometric data was captured, or any data that indicates the user's current location. A positive reauthentication indication is received from the vetting process only if the current user data matches an expected value or range of values.

In one embodiment, the method of FIG. 3 is performed by a mobile device, such as mobile device 105 (FIG. 1), comprising at least one processor and a memory coupled to the, at least one, processor. The memory stores program instructions that are executable by the, at least one, processor to cause the computer system to perform the steps for reauthenticating a user.

Some embodiments of systems and methods for providing dual notifications to a mobile device, as described herein, may be implemented or executed, at least in part, by one or more computer systems. One such computer system is illustrated in FIG. 4. In various embodiments, computer system 400 may be a server, a mainframe computer system, a network appliance, a workstation, a network computer, a desktop computer, a laptop, a tablet, a handheld device, a mobile device, a smartphone, or the like. For example, in some cases, the server running vetting process 107, mobile device 105, and databases 109 as shown in FIG. 1 may include at least one computer such as computer system 400. As explained above, in different embodiments these various computer systems may be configured to communicate with each other in any suitable way, such as, for example, via various networks.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol, including wireless local area networks, WiFi connections, mobile and cellular data networks, and SMS network.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 and 2. Program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations including virtual configurations.

It should be understood that the various operations described herein, particularly in connection with FIGS. 1-3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method comprising:
    collecting images of identification documents from a user via a mobile device;
    collecting still or video images of the user via said mobile device, the still or video images comprising image location data;
    searching one or more databases using search parameters generated from the identification documents and the images;
    verifying, to authenticate the user, said identification documents and said images based upon information collected from the one or more databases, wherein verifying the information comprises comparing the image location data of the still or video image with the current location of the mobile device;
    prompting the user to provide biometric data;
    encrypting the biometric data with an identifier for the mobile device to create a first token;
    assigning a confidence score to the first token; and
    reauthenticating, at a later time, the user by generating a reauthentication token using the image location data and matching the reauthentication token to the first token, wherein the reauthentication is based upon a confidence score threshold that is different among a plurality of applications that selectively provides access to transactions via the reauthentication.

2. The method of claim 1, wherein the identification documents comprise one or more of still images, videos, printed text, electronic text, forms, papers, identification cards, passports, photographs, invoices, statements, and biometric data.

3. The method of claim 1, wherein the search parameters are generated using character recognition processing on said identification documents.

4. The method of claim 1, wherein the search parameters are generated using facial recognition processing of images of the user.

5. The method of claim 1, wherein the databases comprise one or more of a government database, a commercial database, and a social media database.

6. The method of claim 1, wherein the search parameters comprise one or more of a name, a date of birth, a driver's license number, a registration number, an address, an account number, and biometric parameters.

7. The method of claim 1, wherein the information collected from the one or more databases comprises financial record data, utility record data, social media data, and government record data.

8. The method of claim 1, wherein the biometric data comprises one or more of an iris pattern, facial features, fingerprint, heartbeat, and voice signals.

9. The method of claim 1, wherein the identifier for the mobile device comprises one or more of an International Mobile Station Identity (IMSI), an International Mobile Equipment Identity (IMEI), a Mobile Station International Subscriber Directory Number (MSISDN), a unique mobile device identifier, and a network identifier.

10. The method of claim 1, further comprising:
applying a value to each verified identification document, wherein the value corresponds to a level of confidence that the identification document has confirmed the identity of the user;
combining the values to create the confidence score; and
associating the confidence score with said first token.

11. A vetting server for performing the method of claim 1, comprising:
at least one processor and a memory coupled to the at least one processor, the memory storing program instructions executable by the at least one processor to cause the computer system to perform the steps for creating the first token.

12. A method for reauthenticating a user, the method comprising:
prompting the user to provide biometric data on a mobile device, the biometric data comprising image location data;
obtaining an identifier for the mobile device;
encrypting the biometric data with the mobile device identifier to create a reauthentication token;
sending the reauthentication token to a vetting process; and
receiving an indication from said vetting process whether or not the user is reauthenticated, wherein the user is reauthenticated when the reauthentication token matches a stored token that was previously generated using the image location data, wherein a confidence score is associated with the stored token, and wherein the reauthentication is based upon a confidence score threshold that is different among a plurality of applications that selectively provides access to transactions via the reauthentication.

13. The method of claim 12, further comprising:
sending current user data to the vetting process with the reauthentication token; and
receiving a positive reauthentication indication from the vetting process when the current user data matches an expected value or range of values.

14. The method of claim 13, wherein the current user data comprises a time that the biometric data was captured by the mobile device.

15. The method of claim 12, wherein the biometric data comprises one or more of an iris pattern, facial features, fingerprint, heartbeat, and voice signals.

16. The method of claim 12, wherein the identifier for the mobile device comprises one or more of an International Mobile Station Identity (IMSI), an International Mobile Equipment Identity (IMEI), a Mobile Station International Subscriber Directory Number (MSISDN), a unique mobile device identifier, and a network identifier.

17. The method of claim 12, further comprising:
allowing the user to perform a task when a positive reauthentication indication is received from the vetting process.

18. The method of claim 17, wherein the task comprises one or more of a financial transaction, a website login, an acknowledgment, access to a location or event, and access to content.

19. The method of claim 12, further comprising:
allowing the user to perform a task when a reauthentication indication is received from the vetting process with the confidence score exceeding the confidence score threshold.

20. A mobile device for performing the method of claim 12, comprising:
at least one processor and a memory coupled to the at least one processor, the memory storing program instructions executable by the at least one processor to cause the computer system to perform the steps for reauthenticating a user.

* * * * *